US006633493B2

(12) United States Patent
Heinemann et al.

(10) Patent No.: US 6,633,493 B2
(45) Date of Patent: Oct. 14, 2003

(54) INHERENTLY SHORT-CIRCUIT RESISTANT POWER DISTRIBUTION SYSTEM

(75) Inventors: Lothar Heinemann, Hirschberg-Leutershausen (DE); Jens Helfrich, Speyer (DE)

(73) Assignee: ABB Patent GmbH, Mannheim (DE)

( * ) Notice: Subject to any disclaimer, the term of this patent is extended or adjusted under 35 U.S.C. 154(b) by 32 days.

(21) Appl. No.: 10/213,415

(22) Filed: Aug. 5, 2002

(65) Prior Publication Data

US 2003/0025584 A1 Feb. 6, 2003

Related U.S. Application Data

(63) Continuation of application No. PCT/EP01/00142, filed on Jan. 9, 2001.

(30) Foreign Application Priority Data

Feb. 5, 2000 (DE) .......................................... 100 05 176

(51) Int. Cl.[7] ................................................ H02M 3/00
(52) U.S. Cl. ...................................................... 363/15
(58) Field of Search .............................. 363/15, 16, 50, 363/51, 55, 56.01, 95, 97, 131

(56) References Cited

U.S. PATENT DOCUMENTS 6,307,764 B1 * 10/2001 Peek et al. .................. 363/125
6,404,179 B1 * 6/2002 Sugiura et al. ............. 323/355

FOREIGN PATENT DOCUMENTS

| DE | 34 01 287 C2 | 7/1985 |
|---|---|---|
| DE | 40 39 473 A1 | 6/1992 |
| DE | 93 19 889.2 U1 | 6/1995 |
| DE | 298 08 082 U1 | 8/1998 |
| EP | 0 350 767 A1 | 1/1990 |
| EP | 0 710 964 A2 | 5/1996 |
| WO | WO 98/45922 | 10/1998 |

OTHER PUBLICATIONS

Boll, R.: "Entwicklungstendenzen bei weichmagnetischen Werkstoffen" [Development Of Soft Magnetic Materials], Elektronik, No. 14, Jul. 9, 1991, pp. 48–53.

Seitlinger, W. et al.: "Traction Tranformer for Locomotive 1014—Optimizing Various Requirements", ELIN–Zeitschrift, Edition 1/2, 1995, pp. 45–52.

* cited by examiner

*Primary Examiner*—Matthew Nguyen
(74) *Attorney, Agent, or Firm*—Laurence A. Greenberg; Werner H. Stemer; Ralph E. Locher

(57) ABSTRACT

A power distribution system is described for supplying power to electronic assemblies, in particular for use in the field of deep ocean oil production. The electrical power is supplied from a voltage source via a supply cable to the primary winding of a distribution transformer. A number of secondary windings, preferably four, are disposed in addition to the primary winding on the core of the distribution transformer. The windings on the common core are subdivided into a number n of winding packs corresponding to the number n of secondary windings, and with each winding pack containing an n-th part of the primary winding and one of the secondary windings. Electronic assemblies are each connected via a connecting cable to one of the secondary windings.

6 Claims, 5 Drawing Sheets

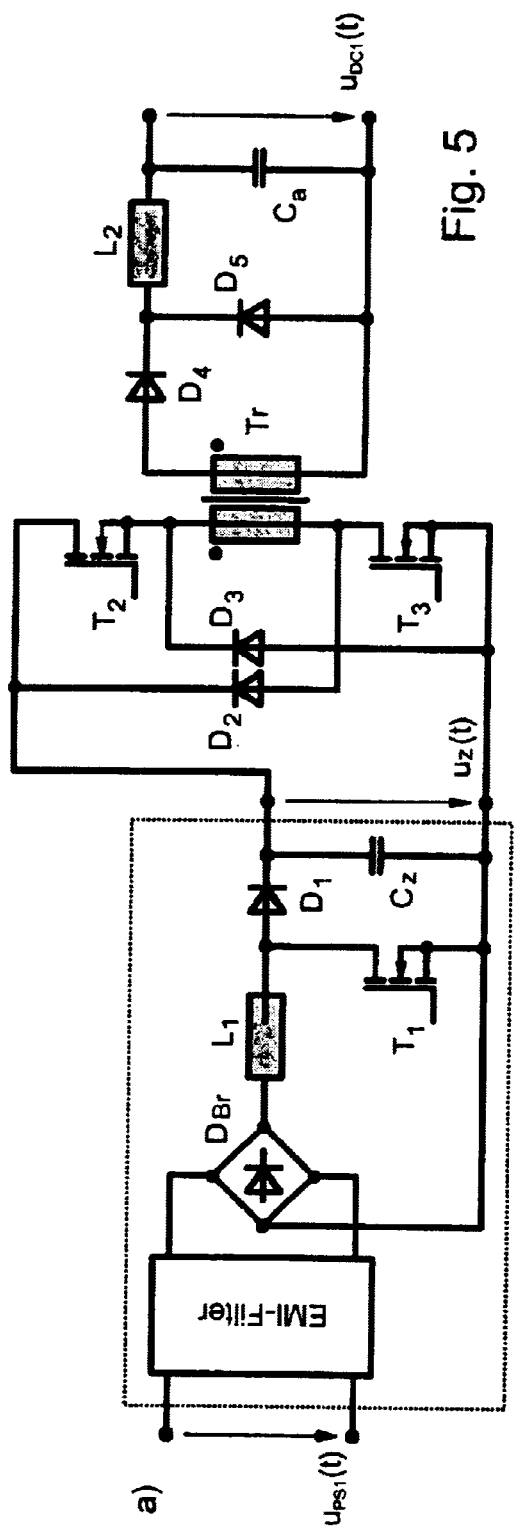
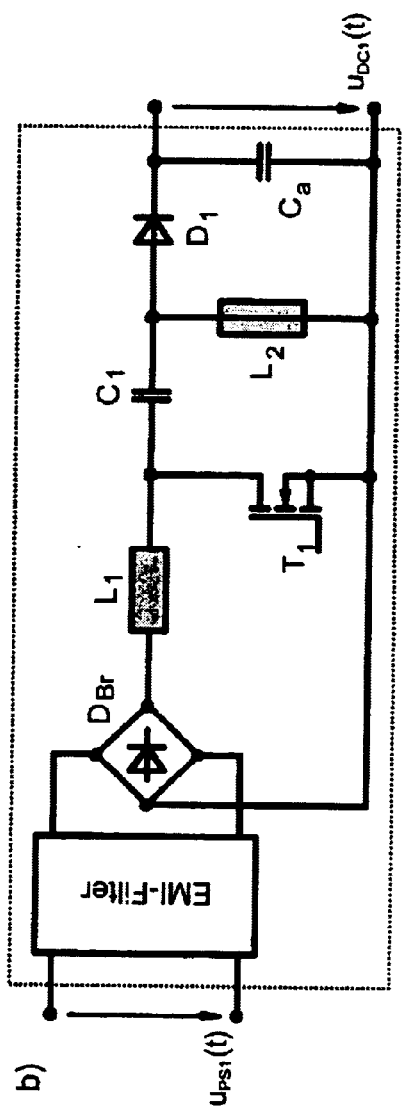
Fig. 5
Fig. 6

INHERENTLY SHORT-CIRCUIT RESISTANT POWER DISTRIBUTION SYSTEM

CROSS-REFERENCE TO RELATED APPLICATION

This application is a continuation of copending International Application No. PCT/EP01/00142, filed Jan. 9, 2001, which designated the United States and was not published in English.

BACKGROUND OF THE INVENTION

Field of the Invention

The invention relates to an inherently short-circuit resistant power supply system, by which electronic assemblies disposed in a decentralized manner can be supplied.

The power distribution system is particularly suitable for supplying electronic assemblies for deep ocean oil production, that is to say for supplying electronic assemblies which are located on the seabed. The following text therefore refers to this application, although the power distribution system is generally applicable.

In deep ocean oil production, many of the processes to be controlled cannot be disposed centrally at one point. Some of the electrical equipment is located on the drilling island, while more of it must be disposed in pressure-resistant containers in the vicinity of the bore holes on the seabed, in which case the distance between the drilling island and the electrical equipment on the seabed is in some cases more than 1 km.

Power is in this case normally supplied to the electrical equipment (sensors, small motors, etc.) on the seabed centrally via a long underwater cable with an AC voltage at a low frequency (50 to 60 Hz) from the drilling pylon. On the seabed the power is then once again distributed using cables with the aid of a transformer, in a star shape to the, in generalized form, n endpoints (bore holes). The voltage at the n endpoints is stabilized by suitable power supply units. Various loads (sensors, small motors etc.) are connected to the outputs of the power supply units.

A distributed power supply system for installations such as these must be very robust and reliable since it is virtually impossible to replace the system on the seabed, or this can be done only with a very high cost penalty. The n outputs of the system must in this case individually be resistant to short circuits, and a short circuit (for example as a result of rocks striking the connecting cable to the power supply unit) must never lead to failure of another output. Therefore, even in the event of a short circuit of m connecting cables (m≦n−1), the serviceability of the remaining output must not be adversely affected. A partial short circuit is also conceivable if, for example, a rock cuts through the insulation of the current-carrying conductor and thus causes a considerable current flow through the conductive seawater surrounding the cable. In a case such as this, a current can occur overall in the supply cable and in the distribution transformer which, although it does not lead to tripping of a protection device on the drilling island (for example being two or three times the rated current) it can, however, actually lead to permanent damage due to overheating of the power distribution system on the seabed.

By way of example, the number of end points is chosen to be n=4 in the following text, in order to describe the power distribution system. This is done not only to explain the prior art, but also, subsequently, to describe the invention.

If the power levels to be transmitted are small (for example <10 W per output), then the short-circuit resistance is normally ensured by bimetallic switches which are disposed in series with the cables and are connected directly to the connection on the secondary side of the transformer, open in the event of a short-circuit current and then always switch on and off again with the specific time constant for the bimetallic switch. For higher power levels (for example 1 kW per output), this method for ensuring short-circuit resistance is no longer feasible. In consequence, other circuitry or measures are required in order to ensure short-circuit resistance.

SUMMARY OF THE INVENTION

It is accordingly an object of the invention to provide an inherently short-circuit resistant power distribution system which overcomes the above-mentioned disadvantages of the prior art devices of this general type, which satisfies the requirements for short-circuit resistance with a high level of efficiency and, furthermore, with low production costs.

With the foregoing and other objects in view there is provided, in accordance with the invention, a power distribution system for supplying power to electronic assemblies. The power distribution system contains a distribution transformer having a core and windings disposed on the core. The windings including a primary winding and a number of secondary windings, and the windings on the core are subdivided into a number n of winding packs corresponding to the number of the secondary windings. Each of the winding packs has an n-th (1/n) part of the primary winding and one of the secondary windings. A supply cable is connected to the primary winding. A voltage source is connected to the supply cable and supplies electrical power through the supply cable to the primary winding. Connecting cables are provided and each connects one of the electronic assemblies to one of the secondary windings.

One particularly advantageous configuration is to use a distribution transformer with four secondary windings, since a U-shaped core can then be used and a uniformly distributed winding configuration is possible in a simple manner.

In accordance with an added feature of the invention, a further transformer is provided and the voltage source is connected to the supply cable with an interposition of the further transformer.

In accordance with another feature of the invention, the connecting cables and the supply cable are deep ocean cables.

In accordance with an additional feature of the invention, power supply units are provided and the electronic assemblies are each connected to one of the connecting cables with an interposition of one of the power supply units. Each of the power supply units are set up to supply a stabilized DC output voltage from an AC input voltage which changes in a ratio of 1:n.

In accordance with a concomitant feature of the invention, the number n is equal to 4, and the core is a UU-shaped core having four core limbs each fitted with one of the winding packs.

Other features which are considered as characteristic for the invention are set forth in the appended claims.

Although the invention is illustrated and described herein as embodied in an inherently short-circuit resistant power distribution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a circuit diagram of a circuit configuration containing a two-stage power supply unit for connection of the respective electronic assembly; and FIG. 6 is a circuit diagram of a circuit configuration with a single-stage power supply unit.

DESCRIPTION OF THE PREFERRED EMBODIMENTS

Figure 1:
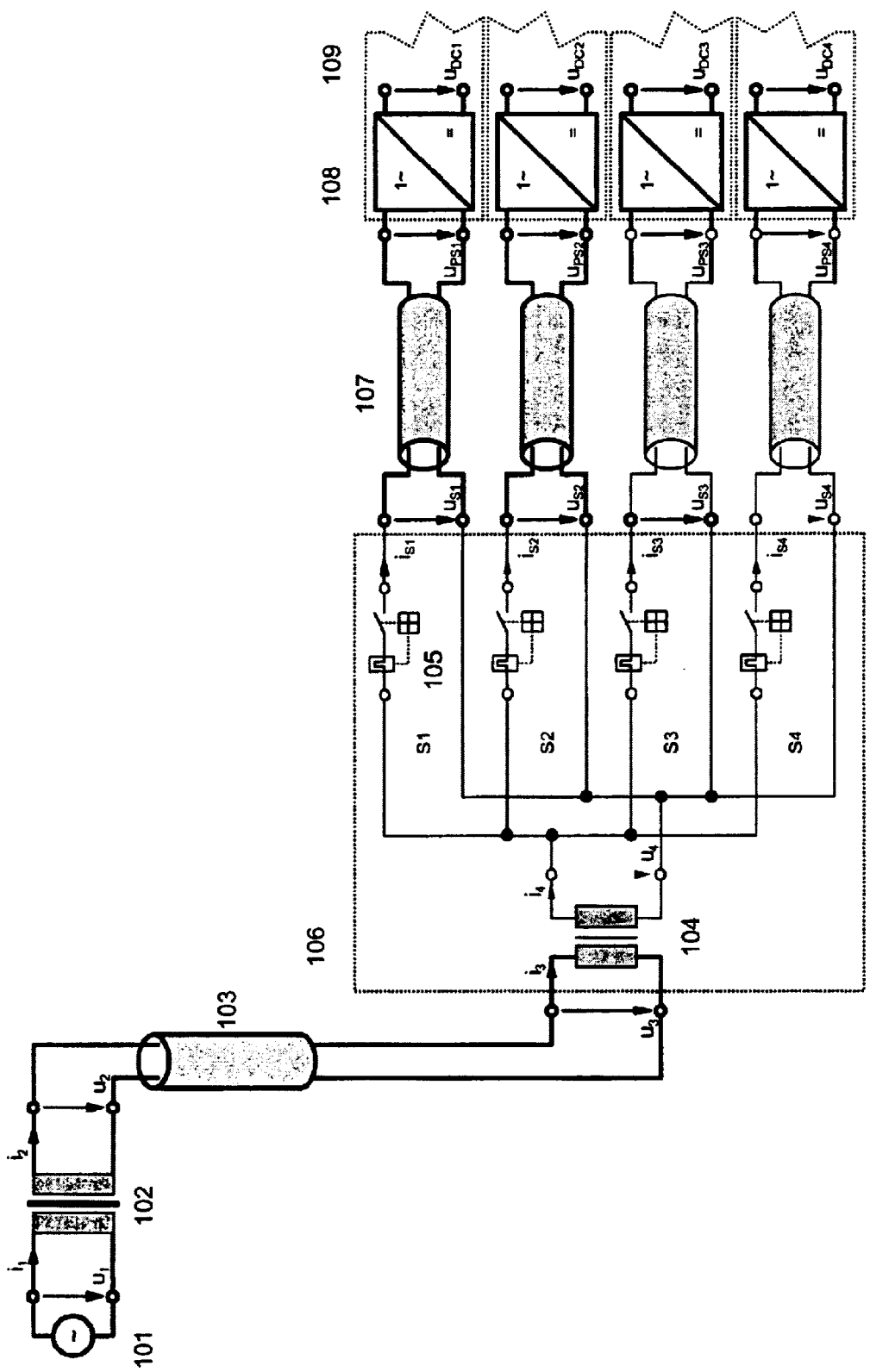
FIG. 1 is a circuit diagram of a power supply system according to the prior art.

Referring now to the figures of the drawing in detail and first, particularly, to FIG. 1 thereof, there is shown a power supply system according to the prior art. In the simplest case, it contains a voltage source 101 located on a drilling island, for example a diesel generator 101 on the drilling island, with a source voltage $u_1(t)$ and a source current $i_1(t)$ as well as a transformer 102, which is connected to the generator 101 and by which the source voltage produced by the generator 101 can be raised to a higher level. The transformer 102 may have a number of taps on the secondary, in order to match a secondary voltage $u_2(t)$ and a secondary current $i_2(t)$ as a function of load conditions on the seabed. One end of a deep ocean supply cable 103 is connected to the secondary of the transformer 102. The other end of the deep ocean supply cable 103 is connected to a primary of a distribution transformer 104, which is accommodated in a pressure-resistant housing 106, on the seabed. The secondary voltage $u_2(t)$ of the transformer 102 and the primary voltage $u_3(t)$ of the distribution transformer 104 differ in magnitude and phase depending on the load state of the power distribution system. $i_3(t)$ denotes the primary current of the distribution transformer 104.

The secondary connection on the distribution transformer 104 has a voltage $u_4(t)$ and a current $i_4(t)$. The individual outputs S1 to S4 of the distribution transformer 104 are normally connected in parallel to the secondary connection, in each case having a series-connected bimetallic switch 105. A voltage $u_{si}(t)$ and a current $i_{si}(t)$ (i=1 . . . 4) are produced at each of the outputs of the pressure container 106. One end of a deep ocean connecting cable 107 is in each case once again connected to all the outputs, and its other end can supply the actual loads by a power supply unit 108 in respective pressure-resistant deep ocean electronic modules 109. $u_{PS1}$ to $u_{PS4}$ denote input voltages of the respective power supply units 108, and $u_{DC1}$ to $u_{DC4}$ denote the DC output voltages from the power supply units.

If the power levels to be transmitted are relatively large, it would admittedly be possible to replace the known simple bimetallic switches 105, which respond in the event of a short circuit, by electronic short-circuit current limiters, for example by a power transistor controlled as a function of the load current. However, this would always necessitate having an auxiliary power supply, which reduces the reliability of the system, to allow the drive power to be delivered in the event of a short circuit. Second, such active short-circuit current limiters would result in additional heat sources, which would necessitate appropriate cooling.

Figure 2:
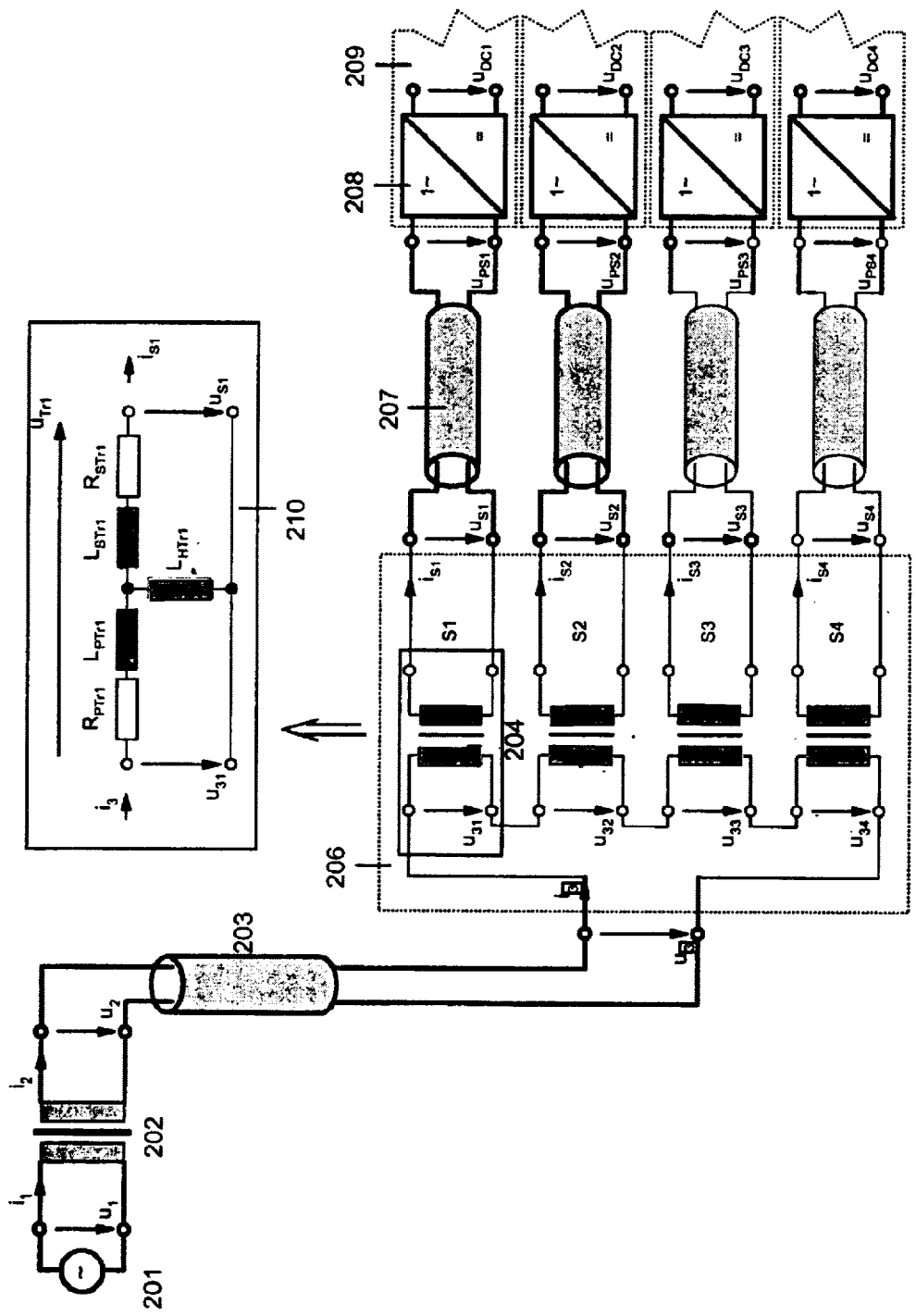
FIG. 2 is a circuit diagram of a modification of the known power supply system.

In principle, there is no need for an active short-circuit current limiter if a separate distribution transformer 204 is used for each output, instead of using a distribution transformer 104. FIG. 2 shows such a configuration. The primaries of the individual distribution transformers 204 are connected in series, so that, with the same loads on the individual outputs and the same transformers 204, it is possible to achieve a uniform distribution of the primary voltage $u_{31}$ to $u_{34}$. The components 201 to 203, as well as 206 to 209, match the correspondingly annotated components 101 to 103 as well as 106 to 109 in FIG. 1.

If one distribution transformer output is short circuited, for example in the event of a defect, the voltage at the output is considerably reduced or, in the event of a short circuit directly at the output terminals, it may even become zero. This results in a short-circuit current, which causes a voltage drop due to the parasitic parameters of the distribution transformer (stray inductance and winding resistance). The voltage drop is then equal to the remaining voltage across the primary winding of the relevant transformer 204. On the basis of the networking rules for electrical networks, the other voltages on the primaries of the transformers 204 that are not affected will be increased in a corresponding manner, so that the secondary voltages on these transformers also change in consequence. The downstream power supply units 208 on the outputs that are not short-circuited must be able to compensate for the voltage variations. This situation will be explained in more detail with reference to an example. For this purpose, it is assumed that the conditions prior to the defect are as follows:

a) all the transformers have the same parameters; and b) all the outputs are each loaded with a power $P_{Si0}$ (i=1 . . . 4).

Owing to the balanced conditions, the same voltages $u_{3i0}(t)$ occur on the primary windings of the transformers 204. Thus, based on the networking rule for the primary circuit:

$$u_{30}(t) = u_{310}(t) + u_{320}(t) + u_{330}(t) + u_{340}(t) = \sum_{i=1}^{4} u_{310}(t) \text{ and hence } u_{3i0}(t) = \frac{u_{30}(t)}{4}$$

If it is assumed in a simplified form and without any loss of generality that the transformation ratio of each transformer is ü=1, each transformer can be represented by an equivalent circuit as shown in the illustration at 210. If the load is $P_{Si0}$, then, in consequence, a current $i_{si0}(t)$ and, on the primary side, the current $i_{30}(t)$ are produced at each of the outputs, which causes a voltage drop $u_{Tri0}(t)$ across the parasitic parameters of each transformer.

This balanced relationship is disturbed if, for example, output S1 is short-circuited. Then, in the worst case, $u_{S1}(t)$= 0, and this results in the secondary short-circuit current $i_{S1k}(t)$ and, in consequence, also the primary short-circuit current $i_{3k}(t)$. The short-circuit current causes a voltage drop $u_{Tr1k}(t)$, which is then equal to the voltage $u_{31k}(t)$. Since $u_{31k}(t) < u_{310}(t)$ the balance is in consequence no longer ensured either, and therefore $u_{3ik}(t)>u_{3i0}(t)(i=2\ldots 4)$ so that this also immediately results in $u_{Sik}(t)>u_{Si0}(t)(i=2\ldots 4)$.

The short-circuit current which occurs can be "controlled" by the transformer parameters. Therefore, a large short-circuit current will occur in a transformer with little scatter (=hard coupling). In a transformer with high scatter (=soft coupling), the voltage drop across the transformer, which is secondary short-circuited, will be greater. This then correspondingly reduces the short-circuit current. This transformer behavior is known and will therefore not be discussed any further. Furthermore, a greater current $i_{3k}(t)$ also results in a greater voltage drop across the deep ocean supply cable 203 and on the transformer 202 that is located on the drilling island, so that the entire system can stabilize itself. With an appropriate configuration, this is true even if three of the four outputs are short-circuited. In fact, the voltage at the remaining output will then correspond approximately to the voltage $u_3(t)$ (minus the voltage drops resulting from the short-circuited outputs). Analogous analyses can be carried out if, for example, individual outputs are not loaded. In this case as well, fluctuations must be expected in the secondary outputs. The downstream power supply units must therefore have a wide input voltage range (approx. 1:4) in order to allow them to compensate for all the fluctuations by the load.

One disadvantage of the circuit which is shown in FIG. 2, and which is produced by modification to the known circuit shown in FIG. 1, is that, as a result of the different load states to be expected, each transformer 204 must in principle be configured for the full input voltage. Otherwise, saturation of the core material of at least one transformer must be expected. Since this leads to unavoidable further heating and to a high magnetization current occurring, this should in principle be avoided since it would lead to failure of the entire system in the event of one transformer output being short circuited. Furthermore, a short circuit flows through all the primary windings of the transformers 204, so that a large copper cross section must be used in order to reduce the power losses. Both the configuration of the core material for the full input voltage and the configuration of the primary windings for a short-circuit current which may occur would lead to the pressure container having an excessively large volume. In consequence, dispensing with an active short-circuit current limiter (which actually also has a small volume), as can be achieved by a circuit as shown in FIG. 2, leads to a large-volume passive configuration. It is therefore not necessarily possible to achieve any major advantage by a passive system as shown in FIG. 2.

Figure 3:
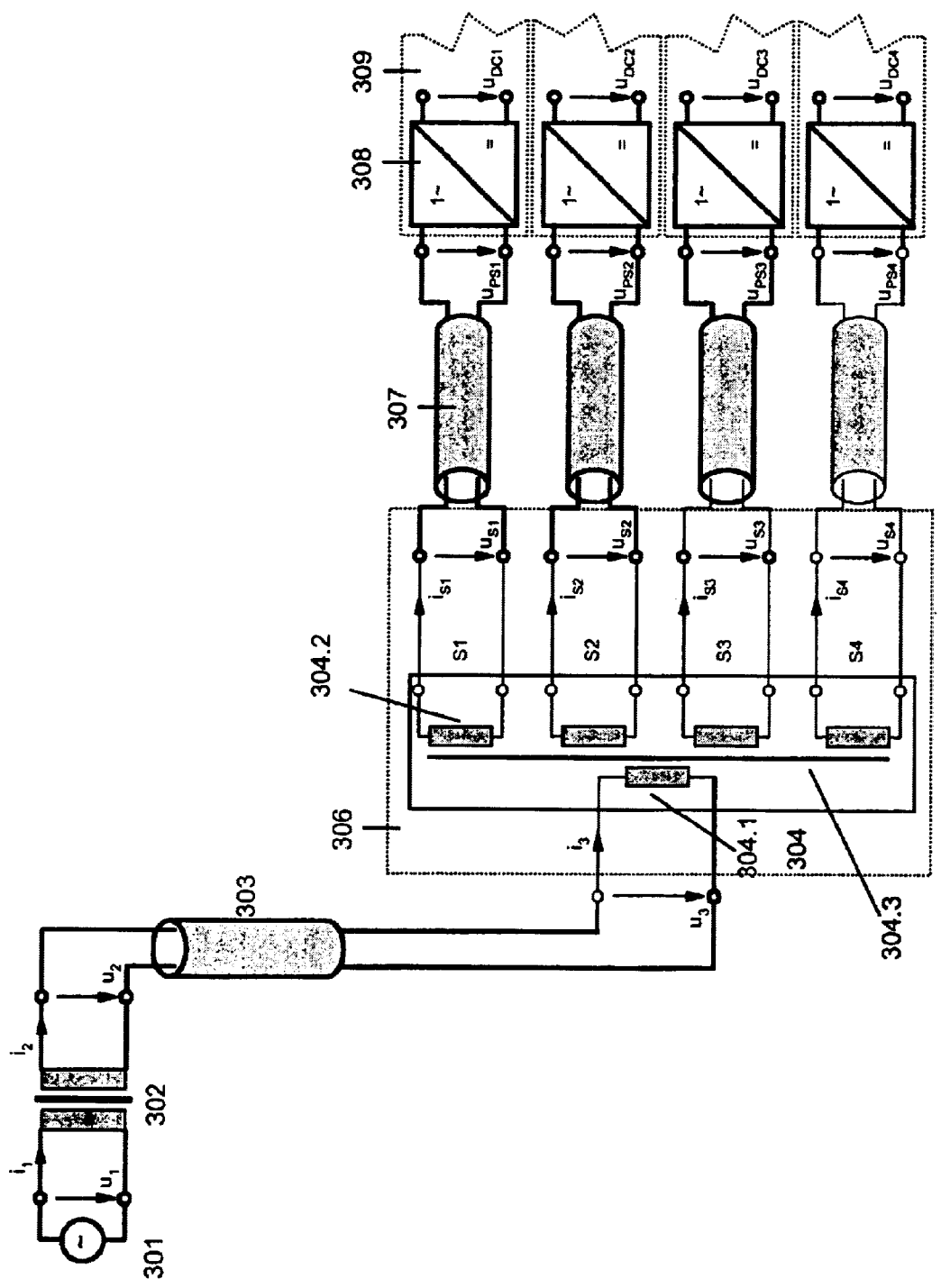
FIG. 3 is a circuit diagram of a power supply system according to the invention.

FIG. 3 shows a circuit configuration according to the invention that makes it possible to avoid the disadvantages of the configuration shown in FIG. 2. In this case, a single distribution transformer 304 is used instead of four individual transformers 204, for example, and the single distribution transformer 304 has a primary winding 304.1 and a number of secondary windings 304.2 of which there are four in the exemplary embodiment, that is to say one secondary winding 304.2 for each connecting line 307 to be connected. The other illustrated components once again correspond to those in FIG. 2.

In order that the desired effect, namely inherent short-circuit resistance, is achieved, when there are a total of n outputs S1 to Sn, the windings must be configured such that one winding pack is in each case disposed on one limb of the core 304.3, containing one n-th part of the turns of the primary winding 304.1 and one of the secondary windings 304.2 in its entirety.

Figure 4:
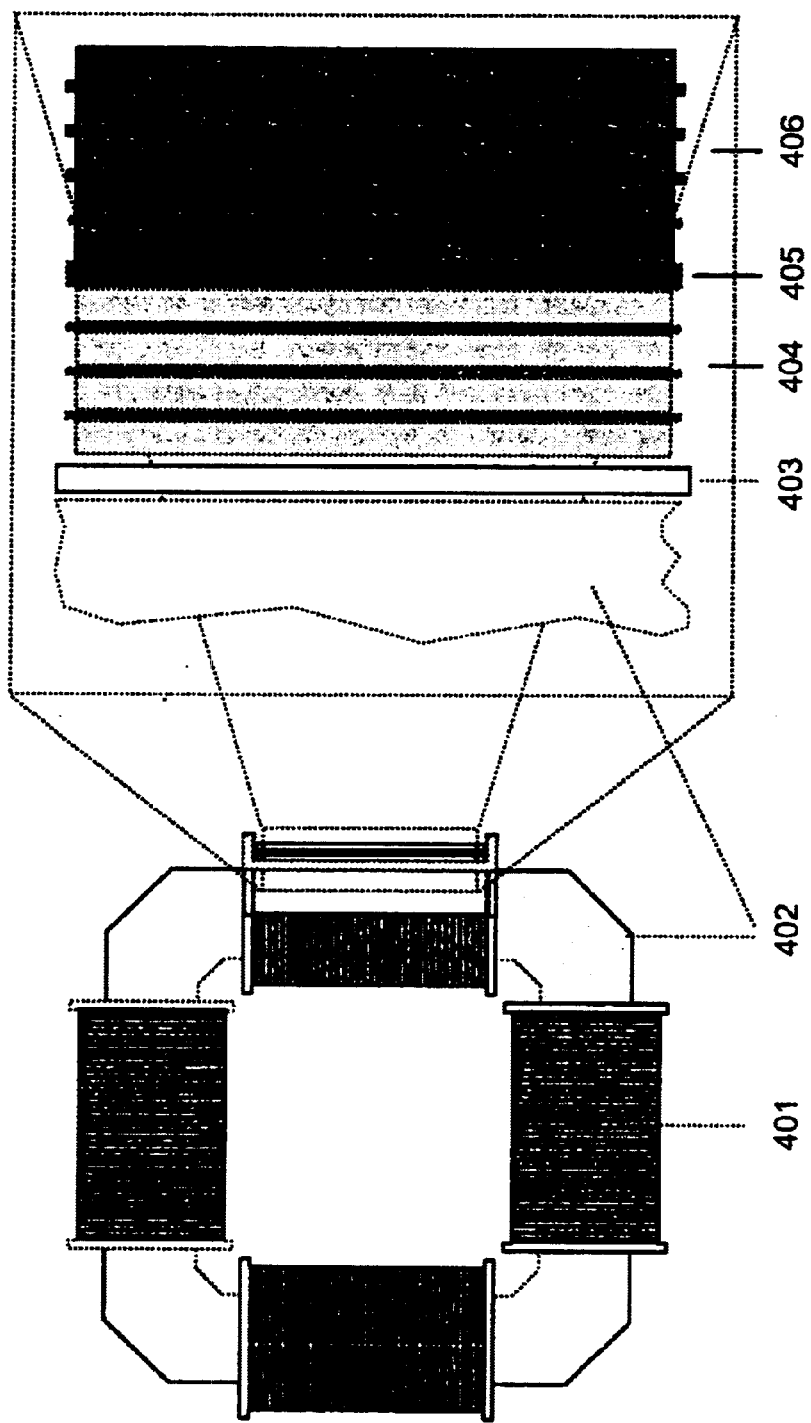
FIG. 4 is an illustration of a preferred winding configuration on a distribution transformer with four secondary windings.

By way of example, FIG. 4 shows a suitable winding configuration for the case n=4.

FIG. 4 shows a UU-shaped core 402 of a distribution transformer whose four core limbs are each fitted with one winding pack 401. Each winding pack 401 has a coil former 403, on which a quarter of the primary winding 404 is fitted. Located above this, there is insulation 405 by which it is possible to achieve the desired coupling between the primary winding part 404 and a secondary winding 406 (corresponding to 304.2 in FIG. 3) fitted above it.

In the event of a short circuit on one of the outputs S1 to S4 (FIG. 3), each transformer element formed by the core 402 and the winding 401 in principle behaves like a single transformer 204 as shown in FIG. 2. The voltage on the primary of the short-circuited transformer is reduced, and the other voltage elements are increased in a corresponding manner. Since all the winding elements have been disposed on one core, the core material need be configured only for the maximum primary voltage to be expected. The short-circuit current can be produced by the coupling of the individual transformer elements. The deep ocean supply cable 303 and the transformer 302 on the drilling island also exert an influence to limit the short-circuit currents, and the transformer 302 may also be configured to have an induction coil, disposed in series with the secondary winding of the transformer 302, in order to limit the current further.

The linear system formed in this way—in an analogous way to the situation of the configuration shown in FIG. 2—results in that the output voltage on the individual outputs depends on the load on the other outputs. An input voltage range of 1:4 must thus be assumed for the downstream power supply units 308 in the example. In the case of the relatively high output power levels considered here, switched-mode power supply units may be used for stabilization of the output voltage, by which the variable input voltage $u_{PS}$ can be converted to a stabilized DC output voltage $u_{DC}$ with low losses (and also in a floating manner, depending on the requirement).

FIGS. 5 and 6 illustrate suitable circuit topologies for implementation of the switched-mode power supply units 308 (FIG. 3).

FIG. 5 shows a two-stage power supply unit in which, even if the AC input voltage is variable, the first stage (boost converter) still produces a stabilized intermediate circuit voltage which is higher than the highest peak value of the AC input voltage to be expected, while the current that is drawn is at the same time sinusoidal. The second stage ensures potential isolation and guarantees that the output voltage will have a level that can be selected. A detailed description of the illustrated circuit stages, with which those skilled in the art are familiar, would be superfluous.

FIG. 6 shows a single-stage concept for providing the power supply unit 308 with a buck boost function. With this topology (SEPIC converter), the output voltage can assume a value that is less than the highest peak value of the AC input voltage to be expected (buck function). At the same time, a sinusoidal current draw can be guaranteed.

The solution illustrated in FIG. 4 and described here thus represents a cost-effective implementation, by which the requirements stated in the introduction are satisfied.

Power distribution systems as shown in FIG. 1 are normally also used for radio-frequency power line communications. If lines are disconnected in the event of a short circuit, the communication is interrupted. In contrast, no disconnection occurs in the event of a fault with the configuration according to the invention, so that a further advantage is that communication is still possible between the respective electronics module 309 and the drilling island.

A further advantageous feature is that the distribution transformer 304 illustrated in FIGS. 3 and 4 can be configured such that there is no need for a pressure-resistant housing, thus making it possible to achieve a further reduction in costs.

We claim:

1. A power distribution system for supplying power to electronic assemblies, comprising:
    a distribution transformer having a core and windings disposed on said core, said windings including a primary winding and a number of secondary windings, said windings on said core subdivided into a number n of winding packs corresponding to said number of said secondary windings, each of said winding packs containing an n-th part of said primary winding and one of said secondary windings;
    a supply cable connected to said primary winding;
    a voltage source connected to said supply cable and supplying electrical power through said supply cable to said primary winding; and
    connecting cables each connecting one of the electronic assemblies to one of said secondary windings.

2. The power distribution system according to claim 1, further comprising a further transformer and said voltage source is connected to said supply cable with an interposition of said further transformer.

3. The power distribution system according to claim 1, wherein said connecting cables and said supply cable are deep ocean cables.

4. The power distribution system according to claim 1, further comprising power supply units, and said electronic assemblies are each connected to one of said connecting cables with an interposition of one of said power supply units, with each of said power supply units being set up to supply a stabilized DC output voltage from an AC input voltage which changes in a ratio of 1:n.

5. The power distribution system according to claim 1, wherein:
    said number n is equal to 4; and
    said core is a UU-shaped core having four core limbs each fitted with one of said winding packs.

6. A power distribution system for supplying power to electronic assemblies used in the field of deep ocean oil production, the power distribution system comprising:
    a distribution transformer having a core and windings disposed on said core, said windings including a primary winding and a number of secondary windings, said windings on said core subdivided into a number n of winding packs corresponding to said number of said secondary windings, each of said winding packs containing an n-th part of said primary winding and one of said secondary windings;
    a supply cable connected to said primary winding;
    a voltage source connected to said supply cable and supplying electrical power through said supply cable to said primary winding; and
    connecting cables each connecting one of the electronic assemblies to one of said secondary windings.

* * * * *